(12) United States Patent
Bealkowski

(10) Patent No.: US 9,021,472 B2
(45) Date of Patent: Apr. 28, 2015

(54) VIRTUALIZING BASEBOARD MANAGEMENT CONTROLLER OPERATION

(75) Inventor: Richard Bealkowski, Redmond, WA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 431 days.

(21) Appl. No.: 12/965,439

(22) Filed: Dec. 10, 2010

(65) Prior Publication Data

US 2012/0151475 A1    Jun. 14, 2012

(51) Int. Cl.
*G06F 9/455*    (2006.01)

(52) U.S. Cl.
CPC ........................ *G06F 9/455* (2013.01)

(58) Field of Classification Search
None
See application file for complete search history.

(56) References Cited

U.S. PATENT DOCUMENTS

| | | | |
|---|---|---|---|
| 7,069,349 B2 | 6/2006 | Hawkins et al. | |
| 7,424,419 B1* | 9/2008 | Fike et al. ....................... | 703/23 |
| 2003/0130969 A1 | 7/2003 | Hawkins et al. | |
| 2003/0152074 A1 | 8/2003 | Hawkins et al. ............. | 370/389 |
| 2004/0078456 A1* | 4/2004 | Kennedy et al. ............. | 709/223 |
| 2004/0083356 A1* | 4/2004 | Chatterjee et al. ................ | 713/1 |
| 2004/0207440 A1* | 10/2004 | Robertson et al. ............ | 327/291 |
| 2005/0066125 A1* | 3/2005 | Tanaka et al. ................. | 711/114 |
| 2005/0076107 A1* | 4/2005 | Goud et al. .................... | 709/223 |
| 2005/0091438 A1* | 4/2005 | Chatterjee .................... | 710/315 |
| 2005/0137833 A1* | 6/2005 | Sistla ........................... | 702/188 |
| 2006/0095551 A1* | 5/2006 | Leung et al. .................. | 709/223 |
| 2006/0100997 A1* | 5/2006 | Wall et al. .......................... | 707/3 |
| 2006/0106968 A1* | 5/2006 | Wooi Teoh .................... | 710/316 |
| 2006/0143422 A1* | 6/2006 | Mashima et al. ............. | 711/170 |
| 2006/0184349 A1* | 8/2006 | Goud et al. ..................... | 703/24 |
| 2006/0242332 A1* | 10/2006 | Johnsen et al. ................. | 710/22 |
| 2007/0006307 A1* | 1/2007 | Hahn et al. ...................... | 726/22 |
| 2007/0056039 A1* | 3/2007 | Khosravi et al. ................ | 726/24 |
| 2007/0067432 A1* | 3/2007 | Tarui et al. .................... | 709/223 |
| 2007/0233455 A1* | 10/2007 | Zimmer et al. .................. | 703/27 |
| 2008/0005748 A1* | 1/2008 | Mathew et al. ............... | 719/318 |
| 2008/0043769 A1* | 2/2008 | Hirai ............................. | 370/420 |
| 2008/0263407 A1* | 10/2008 | Yamamoto ...................... | 714/44 |
| 2008/0313312 A1* | 12/2008 | Flynn et al. ................... | 709/221 |
| 2009/0125901 A1* | 5/2009 | Swanson ........................... | 718/1 |
| 2009/0249319 A1* | 10/2009 | Bai et al. ....................... | 717/168 |
| 2010/0205600 A1* | 8/2010 | Tu et al. ........................... | 718/1 |
| 2011/0004680 A1* | 1/2011 | Ryman ........................... | 709/224 |

* cited by examiner

*Primary Examiner* — Lechi Truong
*Assistant Examiner* — Shih-Wei Kraft
(74) *Attorney, Agent, or Firm* — Edward J. Lenart; Katherine S. Brown; Kennedy Lenart Spraggins LLP

(57) ABSTRACT

A method, apparatus, and computer program product for virtualizing baseboard management controller ('BMC') operation in a host computer comprising a base BMC is provided. Example embodiments include executing, by the host computer, a virtual BMC; registering, by the virtual BMC, with the base BMC of the host computer; and processing BMC requests sent to the base BMC by the virtual BMC. In some example embodiments, prior to registration of the virtual BMC, BMC requests are processed by the base BMC. Some other example embodiments include determining, by the base BMC, periodically at a predefined period of time, whether the virtual BMC is active; and upon the base BMC determining that the virtual BMC is not active: deregistering, by the base BMC, the virtual BMC; and processing subsequently received BMC requests by the base BMC.

18 Claims, 11 Drawing Sheets

VIRTUALIZING BASEBOARD MANAGEMENT CONTROLLER OPERATION

BACKGROUND OF THE INVENTION

1. Field of the Invention

The field of the invention is data processing, or, more specifically, methods, apparatus, and products for virtualizing baseboard management controller ('BMC') operation in a host computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today contain many and various types of components. To insure efficient and uninterrupted operation of such a computer system, operational characteristics of the computer system's components may be monitored. In some computer systems, for example, a baseboard management controller ('BMC') may monitor various components. A BMC is a microcontroller, typically embedded on a motherboard of a computer system, such a server. A BMC may interface with components of the computer system and with other computer systems in accordance with the Intelligent Platform Management Interface (IPMI) architecture. The BMC manages the interface between system management software and platform hardware.

Different types of sensors embedded in a computer system may be configured to report to the BMC such parameters as temperature, cooling fan speeds, power status, operating system (OS) status, and so on. BMCs installed in today's computing systems, however, may have limited resources and limited capabilities, with few, if any, ways of augmenting such capabilities.

SUMMARY OF THE INVENTION

Methods, apparatus, and products for virtualizing BMC operation in a host computer that includes a base BMC are described. Virtualizing BMC operation in accordance with embodiments of the present invention includes executing, by the host computer, a virtual BMC; registering, by the virtual BMC, with the base BMC of the host computer; and processing BMC requests by the virtual BMC.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
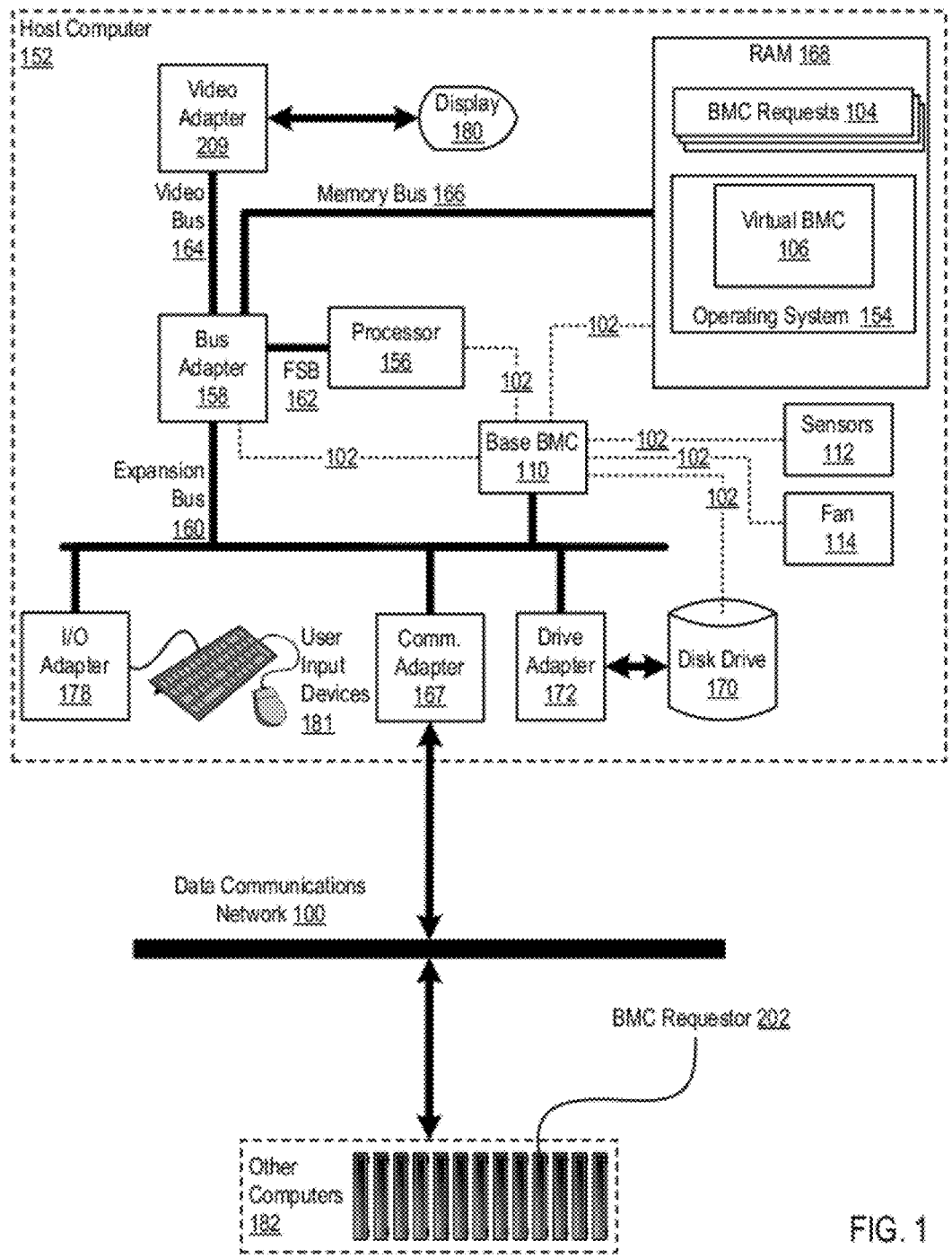
FIG. 1 sets forth a network diagram of an example system for virtualizing BMC operation according to embodiments of the present invention.

Exemplary methods, apparatus, and products for virtualizing BMC operation in a host computer in accordance with the present invention are described with reference to the accompanying drawings, beginning with FIG. 1. FIG. 1 sets forth a network diagram of an example system for virtualizing BMC operation according to embodiments of the present invention. The system of FIG. 1 includes a host computer (152)—a module of automated computing machinery configured to virtual BMC operation.

The host computer (152) of FIG. 1 includes at least one computer processor (156) or 'CPU' (Central Processing Unit) as well as random access memory (168) ('RAM') which is connected through a high speed memory bus (166) and bus adapter (158) to processor (156) and to other components of the host computer (152).

The host computer (152) also includes a base BMC (110). A BMC, as mentioned above, is a microcontroller typically embedded on a motherboard of a computer, such as a server. A BMC is often referred the intelligence in the Intelligent Platform Management Interface (IPMI) architecture. IPMI is a specification that defines a set of common interfaces to a computer system that system administrators can use to monitor system health and manage the system. An IPMI subsystem operates independently of an operating system and allows administrators to manage a system remotely even in the absence of an operating system or of the system management software, or even if the monitored system is powered off but connected to a power source. IPMI can also function after the operating system has started, and exposes management data and structures to the system management software. IPMI prescribes only the structure and format of the interfaces as a standard, while detailed implementations may vary.

The BMC manages the interface between system management software and platform hardware. Different types of sensors (112) embedded in a computer system report to the BMC on parameters such as temperature, cooling fan (114) speeds, power status, operating system (OS) status, and so on. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system. Physical interfaces to the BMC may vary, and include, as examples SMBus busses, an RS-232 serial console, address and data lines, and an Intelligent Platform Management Bus (IPMB), that enables the BMC to accept IPMI request messages from other management controllers in the system.

The BMC (110) in the example host computer (152) of FIG. 1 is described as a 'base' BMC in that the BMC is a physical microcontroller not a virtual BMC as described below. The base BMC (110) in the example of FIG. 1 may access sensors (112), one or more fans (114), and other components of the computer, through out-of-band communications links (102). Such components and out-of-band-links may be referred to in this specification as the BMC subsystem.

Stored in RAM (168) is an operating system (154) that includes a virtual BMC (106). Operating systems useful in systems that virtualize BMC operation according to embodiments of the present invention include UNIX™, Linux™, Microsoft XP™, AIX™, IBM's i5/OS™, and others as will occur to those of skill in the art.

A virtual BMC as the term is used here refers to a module of computer program instructions that when executed simulates operation of a physical—base BMC—from the perspective of BMC requestors (202). A BMC requestor, as the term is used in this specification is any computer, hardware component, device, software, or other entity that sends a BMC request to a BMC, virtual or otherwise. In the example of FIG. 1, the virtual BMC (106) is executed by the host computer (152) as a component of the operating system (154), but readers of skill in the art will recognize that such a virtual BMC may also be executed in other ways including, for example, as a virtual machine supported by execution of a hypervisor.

The host computer (152) in the example of FIG. 1 may virtualize BMC operation in accordance with embodiments of the present invention by executing the virtual BMC (106); registering, by the virtual BMC (106), with the base BMC (110); and processing BMC requests (104) by the virtual BMC (106). Registering with the base BMC (110) informs the base BMC (110) that the virtual BMC will process subsequently received BMC requests (104). The base BMC, unless requested by the virtual BMC to do so or if the virtual BMC becomes inactive, will not process these requests. Prior to execution of the virtual BMC (106), the base BMC may process any BMC requests (106).

Virtualizing BMC operation in accordance with the present invention enables expansion of embedded BMC capability. The virtual BMC (106) in the example system of FIG. 1 may be configured to process BMC requests that the base BMC (110) is not capable of processing. That is, the virtual BMC (106) may effectively augment or expand capabilities of the base BMC. Consider, for example, that the host computer (152) receives a BMC request for a web server interface. Consider further that the base BMC (110) is incapable of providing such a web server interface. The virtual BMC (106) may expand or augment the capabilities of the base BMC (110) by providing the requested web server interface.

The operating system (154), virtual BMC (106), and the BMC requests (104), in the example of FIG. 1 are shown in RAM (168), but many components of such software typically are stored in non-volatile memory also, such as, for example, on a disk drive (170).

The host computer (152) of FIG. 1 includes disk drive adapter (172) coupled through expansion bus (160) and bus adapter (158) to processor (156) and other components of the host computer (152). Disk drive adapter (172) connects non-volatile data storage to the host computer (152) in the form of disk drive (170). Disk drive adapters useful in computers for virtualizing BMC operation according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example host computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary host computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP ('Internet Protocol') data communications networks, and in other ways as will occur to those of skill in the art. Communications adapters implement the hardware level of data communications through which one computer sends data communications to another computer, directly or through a data communications network. Examples of communications adapters useful for virtualizing BMC operation according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
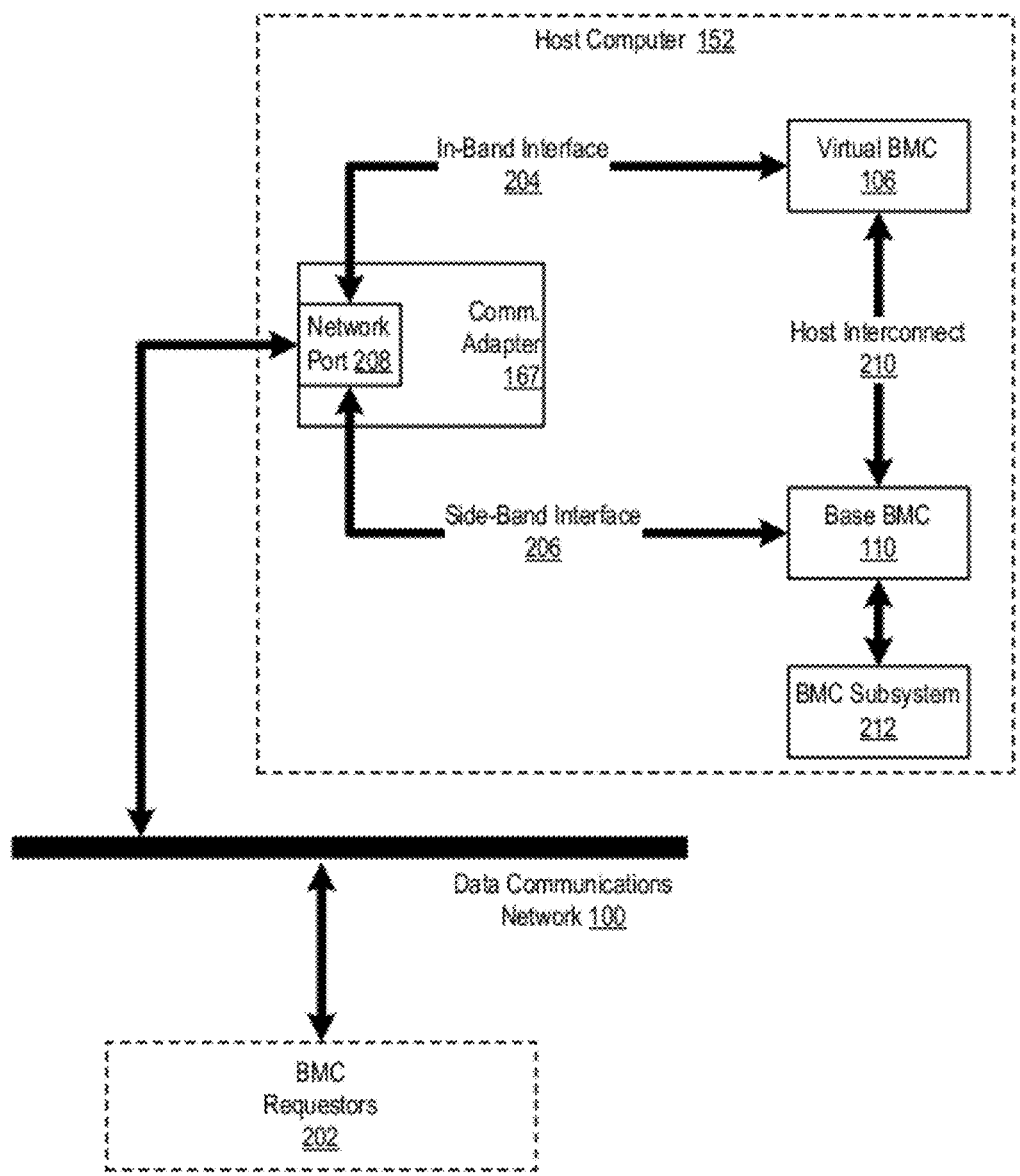
FIG. 2 sets forth a functional block diagram of a side-band coupled data communications configuration.

The virtual BMC (106) and base BMC (110) may be operatively coupled for data communications with BMC requests and with each other in various configurations. For further explanation, therefore, FIGS. 2, 3, and 4 each set forth a functional block diagram of a different data communications configurations. FIG. 2 sets forth a functional block diagram of a side-band coupled data communications configuration. In the example configuration of FIG. 2, the virtual BMC (106) is operatively coupled for data communications with one or more BMC requestors (202) through a network port (208) of a communications adapter (167) of the host computer such as the host computer (152) on FIG. 1. The virtual BMC (106) is coupled to the network port (208) through an 'in-band' interface (204). The term in-band refers to primary data communications channels, while side-band refers to secondary data communications channels. An example an in-band interface (204) between a virtual BMC (106) and a communications adapter (167) is set forth in the example host computer (152) of FIG. 1 and includes the busses (162, 160) and components (158) coupling the processor (156) executing the virtual BMC (106) to the communications adapter (167).

Turning back to FIG. 2, the base BMC (110) is also operatively coupled for data communications with the BMC requestors (202) through a side-band interface (206) coupled to the network port (208). Further, the virtual BMC (106) is coupled to the base BMC (110) for data communications through a host interconnect. In some embodiments the host interconnect is a register-level, high bandwidth interface that enables the base BMC to communicate with the virtual BMC in software.

In the configuration of FIG. 2, the virtual BMC (106), when registering with the base BMC (110) assumes the base BMC's network address—such as the base BMC's IP address—and processes BMC requests by receiving all BMC requests sent to the base BMC's network address. The virtual BMC (106) in the example of FIG. 2 effectively spoofs the base BMC's network identity, intercepting all network traffic intended for the base BMC.

Figure 3:
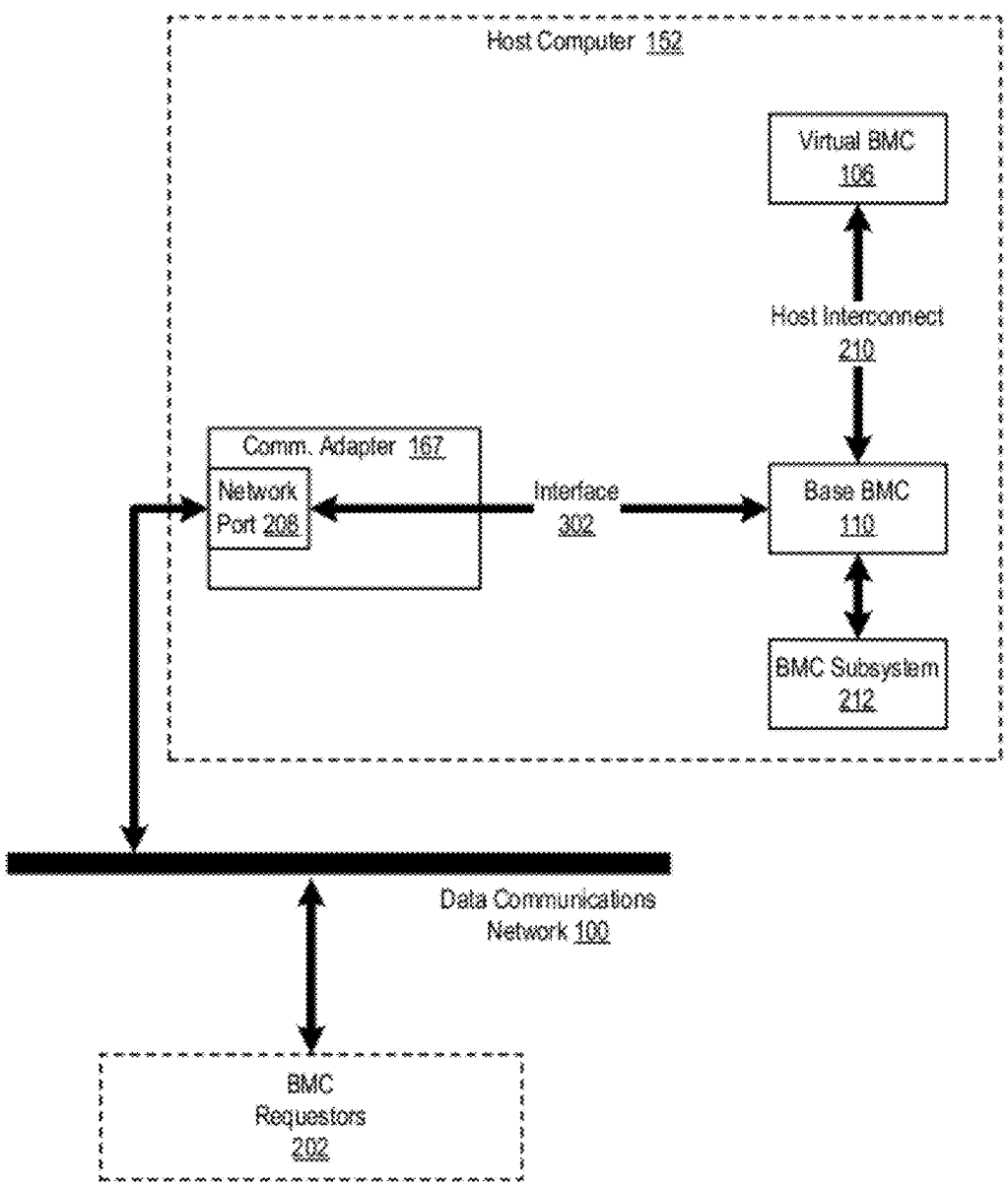
FIG. 3 sets forth a functional block diagram of a data communications configuration that includes a network port dedicated to the base BMC.

For further explanation, FIG. 3 sets forth a functional block diagram of a data communications configuration that includes a network port dedicated to the base BMC. In the example configuration of FIG. 3, the base BMC (110) is operatively coupled for data communications with one or more BMC requestors (202) through a network port (208) of a communications adapter (167) of the host computer (152 on FIG. 1). The base BMC (110) is coupled to the network port (208) through an interface (302), such as a data communications bus. The base BMC (110) is also coupled to the BMC subsystem (212) to monitor and collect information describing components of the host computer.

The virtual BMC (106), in the example of FIG. 3, is operatively coupled for data communications with the base BMC (110) through a host interconnect (210). In the configuration of FIG. 3, the virtual BMC (106) processes BMC requests from BMC requests (202) by receiving, the BMC requests through the host interconnect (210) from the base BMC (110). That is, the base BMC (110) in the example of FIG. 3 receives the BMC requests through the network port (208) and interface (302) and forwards the BMC requests along to the virtual BMC (106) through a host interconnect (210). The virtual BMC (106) after carrying out any tasks included in the requests, provides, to the base BMC (110) through the host interconnect (210), a response to each BMC request. Each response is sent, by the base BMC (110) through the network port (208) of the communications adapter (167), to the BMC requestors (202). In some embodiments, prior to forwarding the requests to virtual BMC (106), the base BMC (110) may decode the requests. For example, a BMC request comprising an IPMI event may be decoded and passed along in decoded form to the virtual BMC (106).

Figure 4:
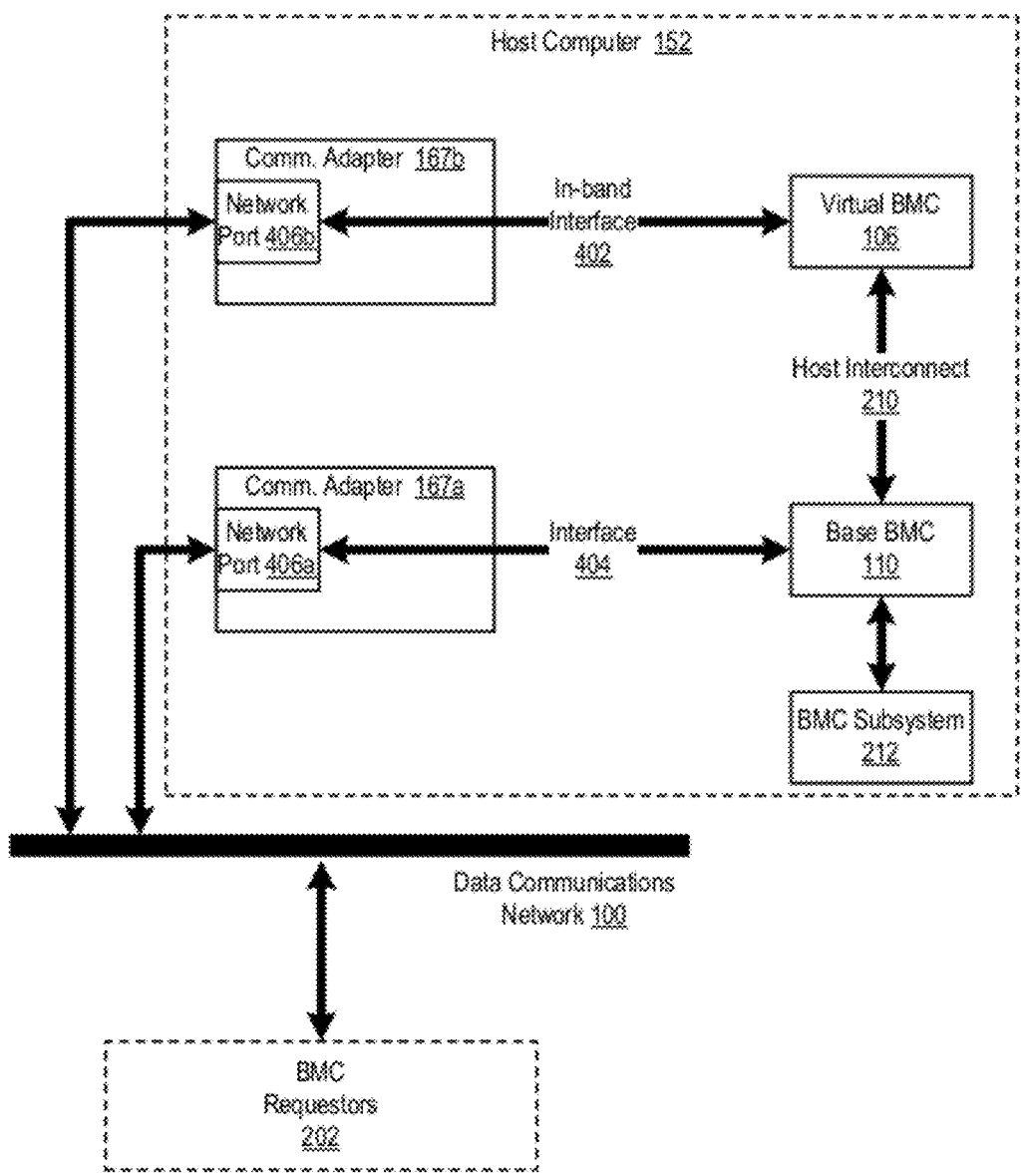
FIG. 4 sets forth a functional block diagram of a data communications configuration that includes a first network port dedicated to the base BMC and a second network port dedicated to the virtual BMC.

For further explanation, FIG. 4 sets forth a functional block diagram of a data communications configuration that includes a first network port dedicated to the base BMC and a second network port dedicated to the virtual BMC. In the example configuration of FIG. 4, the base BMC (110) is operatively coupled for data communications with one or more BMC requestors (202) through a first network port (406a) of a first communications adapter (167a) of the host computer (152 on FIG. 1). The base BMC (110) is coupled to the first network port (406a) through an interface (404), such as a data communications bus. The base BMC (110) is also coupled to the BMC subsystem (212) to monitor and collect information describing components of the host computer.

The virtual BMC (106) is operatively coupled for data communications with the one or more BMC requestors (202) through a second network port (406b) of the host computer. In the example of FIG. 1, the second network port (406b) is implemented as a component of a second communications adapter (167b) of the host computer (152 on FIG. 1) for ease of explanation, not limitation. Readers of skill in the art will recognize that second network ports dedicated for use by virtual BMCs (106) for virtualizing BMC operation in accordance with embodiments of the present invention may be implemented as a component of the same communications adapter that supports the first network port (406a) dedicated for use by the base BMC (110). The virtual BMC in the example of FIG. 1 is coupled to the second network port (406b) through an in-band interface (402).

In the example configuration of FIG. 4, the virtual BMC (106) is operatively coupled for data communications with the base BMC (110) through a host interconnect (210) and the virtual BMC may process BMC requests from the BMC requestors (202) by receiving the BMC requests from the base BMC (110) through the host interconnect (210). That is, the base BMC (110) receives the BMC requests through the first network port (406a) and forwards the BMC requests to the virtual BMC (106) through the host interconnect (210). The virtual BMC, after carrying out any tasks included in the BMC requests, sends one or more responses to the BMC requests to the BMC requestors (202) through the second network port (406b). In the example of FIG. 4, requests flow into the first network port (406a), through the base BMC (110) to the virtual BMC, and responses flow from the virtual BMC (106) through the second network port (406b) to the BMC requestors (202).

Figure 5:
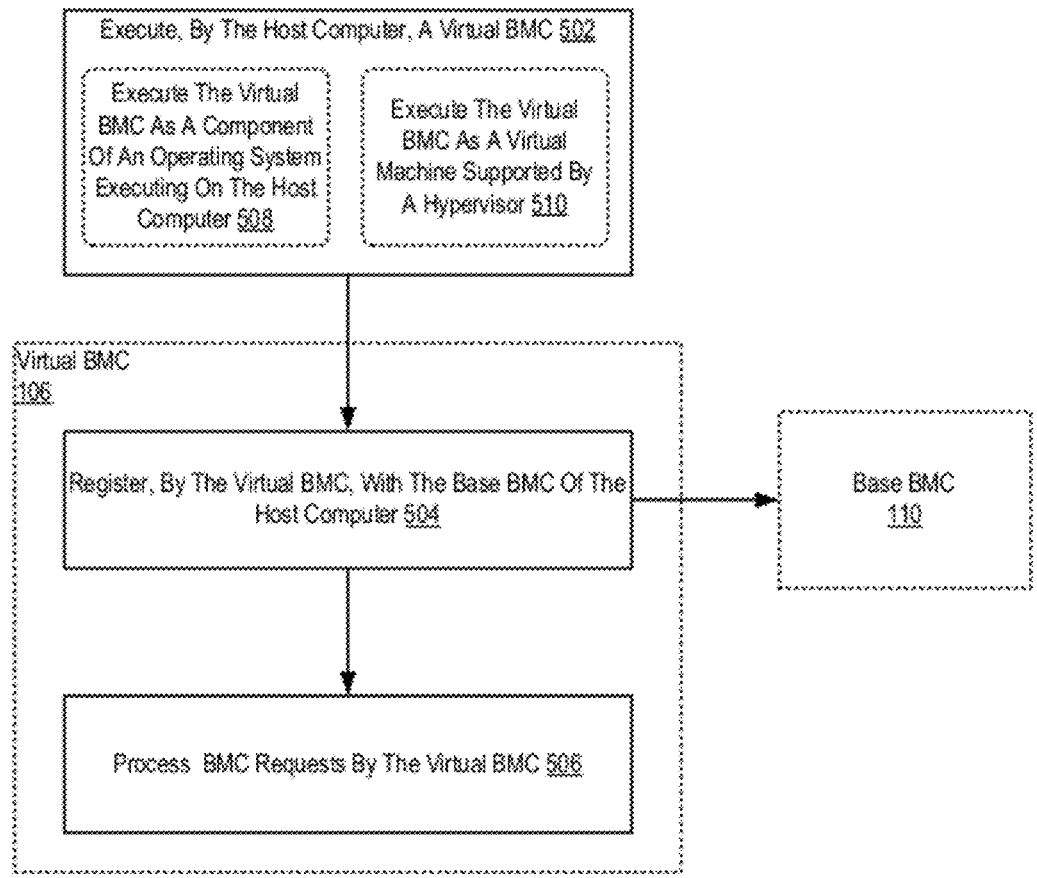
FIG. 5 sets forth a flow chart illustrating an exemplary method for virtualizing BMC operation in a host computer that includes a base BMC according to embodiments of the present invention.

FIG. 5 sets forth a flow chart illustrating an exemplary method for virtualizing BMC operation in a host computer that includes a base BMC according to embodiments of the present invention. The method of FIG. 5 includes executing (502), by the host computer, a virtual BMC; registering (504), by the virtual BMC, with the base BMC of the host computer; and processing (506) BMC requests by the virtual BMC.

In the method of FIG. 5, executing (502) a virtual BMC may be carried out in various ways including executing (508) the virtual BMC as a component of an operating system executing on the host computer or executing (510) the virtual BMC as a virtual machine supported by a hypervisor. A virtual machine is a software implementation of a machine, such as a computer, that executes instructions like a physical machine. Virtual machines are separated into two major categories, based on use and degree of correspondence to a real machine. A system virtual machine provides a complete system platform which supports the execution of a complete operating system (OS). In contrast, a process virtual machine is designed to run a single program, that is, a process virtual machine that it supports a single process.

Registering (504) with the base BMC of the host computer may be carried out by setting by the virtual BMC upon startup a 'virtual BMC active' flag in the base BMC, a bit, bit pattern, a value in memory, and so on that represents an active virtual BMC. When the flag is set, the base BMC is configured to surrender BMC operation to the virtual BMC.

Processing (506) BMC requests by the virtual BMC may be carried out in various ways depending upon the requests. In fact, the virtual BMC (106) may process BMC requests by utilizing the base BMC (110) to monitor components of the host computer, collect data from the components, and perform tasks.

Figure 6:
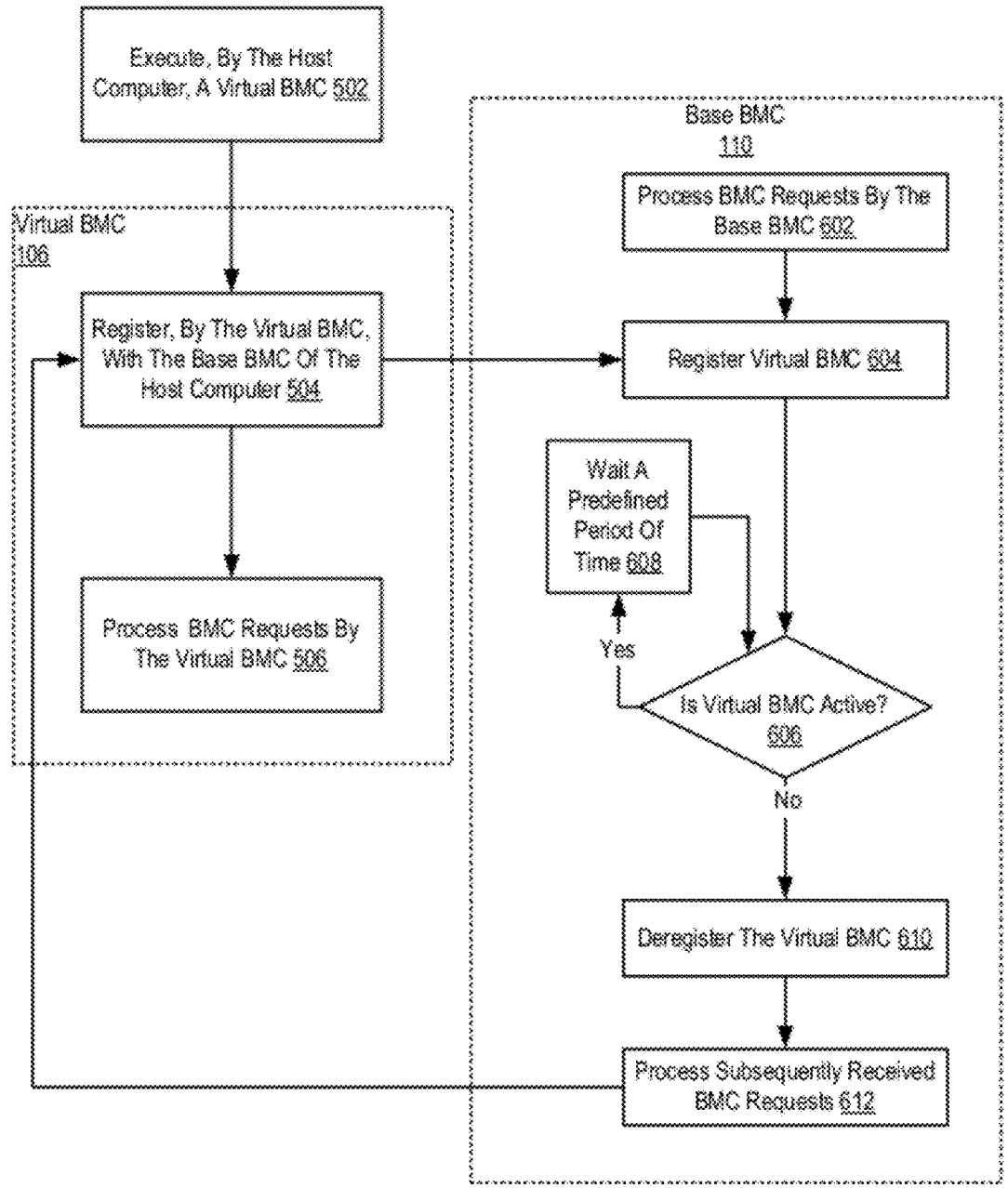
FIG. 6 sets forth a flow chart illustrating a further exemplary method for virtualizing BMC operation according to embodiments of the present invention.

For further explanation, FIG. 6 sets forth a flow chart illustrating a further exemplary method for virtualizing BMC operation according to embodiments of the present invention. The method of FIG. 6 is similar to the method of FIG. 5 in that the method of FIG. 6 includes executing (502) a virtual BMC; registering (504) with the base BMC; and processing (506) BMC requests by the virtual BMC.

The method of FIG. 6 differs from the method of FIG. 5, however, in that in the method of FIG. 6, prior to registration of the virtual BMC (106), the base BMC processes (602) BMC requests. That is, the base BMC operates without virtual BMC aid until the virtual BMC is active and registers with the base BMC.

After the base BMC registers (604) the virtual BMC, surrendering BMC operation to the virtual BMC, the method of FIG. 6 continues by determining (606), by the base BMC (110), whether the virtual BMC (106) is active. A virtual BMC (106) may become inactive for various reasons, including, for example, a software execution error causing a crash of the virtual BMC, a hardware malfunction halting execution of the BMC, and so on as will occur to readers of skill in the art.

Upon the base BMC (110) determining that the virtual BMC is not active, the method of FIG. 6 continues by deregistering (610) the virtual BMC (106); and processing (612) subsequently received BMC requests by the base BMC. Deregistering (610) the virtual BMC (106) may be carried out by initializing—that is, clearing—a 'virtual BMC active' flag.

If the base BMC determines that the virtual BMC is active, however, the method of FIG. 6 continues by waiting (608) a predefined period of time and again determining (606) whether the virtual BMC is active. That is, in the method of FIG. 6, once the base BMC (110) surrenders BMC operation to the virtual BMC (106), the base BMC (110) periodically at a predefined period of time, determines (606) whether the virtual BMC is active. This determination occurs periodically, while the virtual BMC operates and when the virtual BMC is not operating—not active. The periodic check—determination (608)—may be described as a heartbeat. Once the heartbeat is lost (the virtual BMC is not active), the base BMC resumes normal operation.

In some embodiments, the virtual BMC may become active after a period of inactivity. Consider, for example, a period of inactivity caused by a crash of the virtual BMC software. Once the virtual BMC software is restarted, the virtual BMC may again register with the base BMC and process BMC requests.

Figure 7:
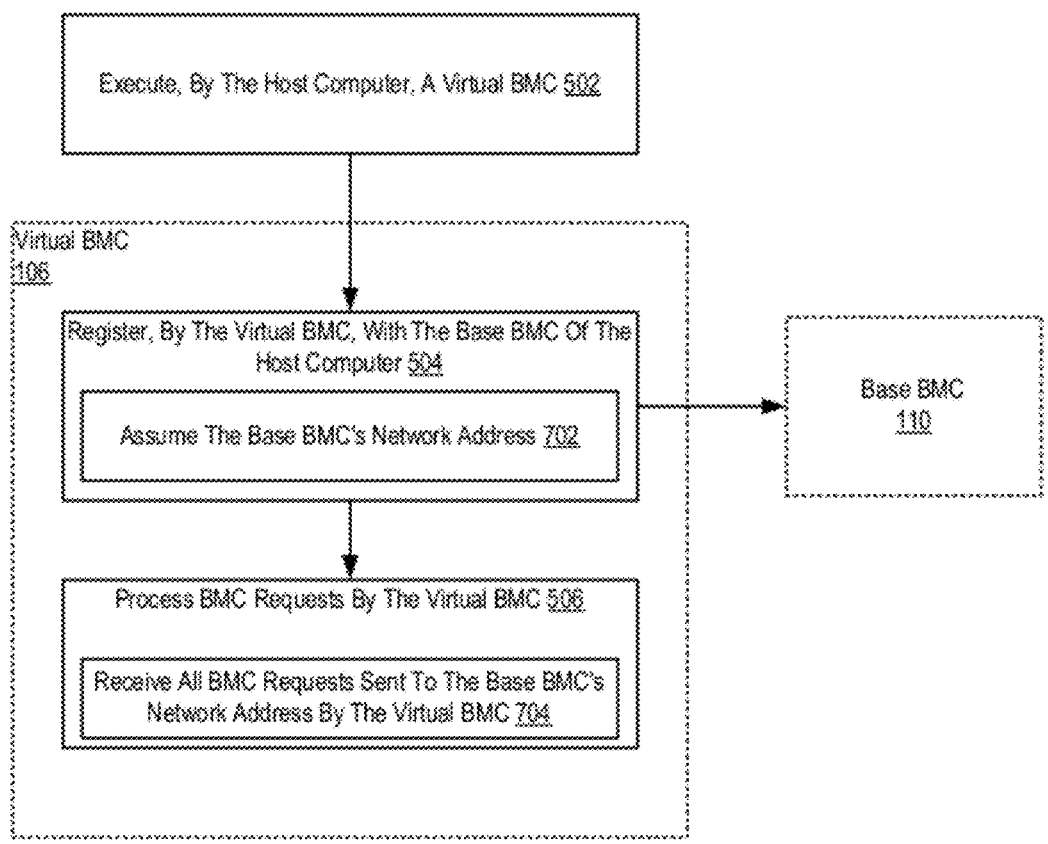
FIG. 7 sets forth a flow chart illustrating a further exemplary method for virtualizing BMC operation according to embodiments of the present invention.

For further explanation, FIG. 7 sets forth a flow chart illustrating a further exemplary method for virtualizing BMC operation according to embodiments of the present invention. The method of FIG. 7 is similar to the method of FIG. 5 in that the method of FIG. 7 includes executing (502) a virtual BMC; registering (504) with the base BMC; and processing (506) BMC requests by the virtual BMC.

The method of FIG. 7 differs from the method of FIG. 5, however, in that the method of FIG. 7 is carried out with the virtual BMC and base BMC in a side-band coupled data communications configuration similar to that depicted in the example of FIG. 2. In such a configuration, the virtual BMC (106) is operatively coupled for data communications with one or more BMC requestors through a network port of a communications adapter of the host computer and the base BMC (110) is operatively coupled for data communications with the BMC requestors through a side-band interface coupled to the network port. In the method of FIG. 7, registering (504), by the virtual BMC, with the base BMC includes assuming (702) the base BMC's network address and processing (506) BMC requests by the virtual BMC includes receiving (704) all BMC requests sent to the base BMC's network address by the virtual BMC For further explanation, FIG. 8 sets forth a flow chart illustrating a further exemplary method for virtualizing BMC operation according to embodiments of the present invention. The method of FIG. 8 is similar to the method of FIG. 5 in that the method of FIG. 8 includes executing (502) a virtual BMC; registering (504) with the base BMC; and processing (506) BMC requests by the virtual BMC.

Figure 8:
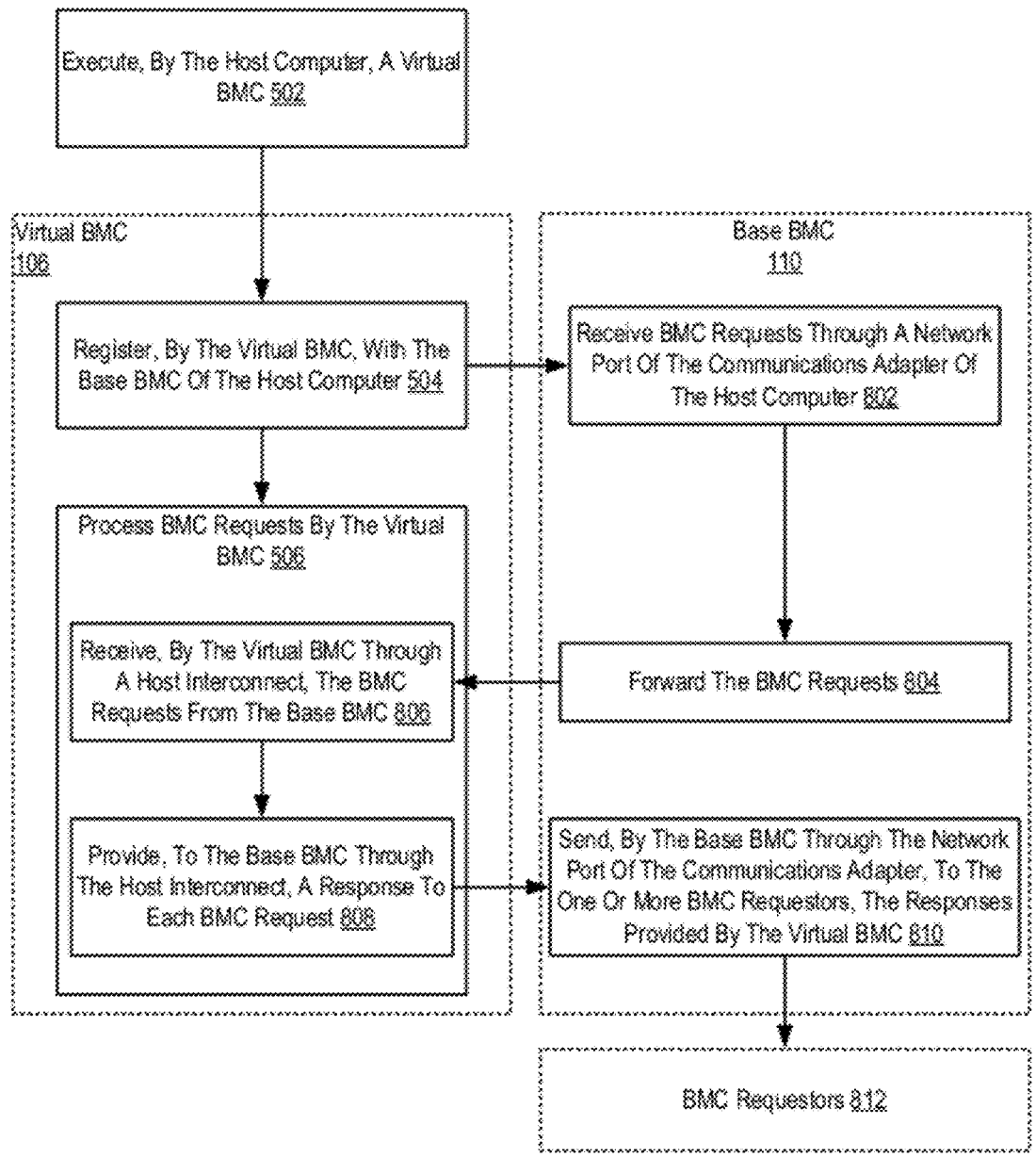
FIG. 8 sets forth a flow chart illustrating a further exemplary method for virtualizing BMC operation according to embodiments of the present invention.

The method of FIG. 8 differs from the method of FIG. 5, however, in that the method of FIG. 8 is carried out with the virtual BMC and base BMC in a data communications configuration that includes a network port dedicated to the base BMC, similar to the configuration depicted in the example of FIG. 3. In such a configuration, the base BMC (110) is operatively coupled for data communications with one or more BMC requestors (812) through a network port of a communications adapter of the host computer and the virtual BMC (106) is operatively coupled for data communications with the base BMC through a host interconnect.

In the method of FIG. 8, once the virtual BMC registers (504) with the base BMC, the base BMC receives (802) BMC requests through the network port of the communications adapter of the host computer and forwards (804) the BMC requests to the virtual BMC through the host interconnect. In the method of FIG. 8, then, processing (506) BMC requests by the virtual BMC includes receiving (806) the BMC requests from the base BMC and providing (808), by the virtual BMC to the base BMC through the host interconnect, a response to each BMC request. The base BMC (110) then sends (810), through the network port, each response to the one or more BMC requestors (812).

Figure 9:
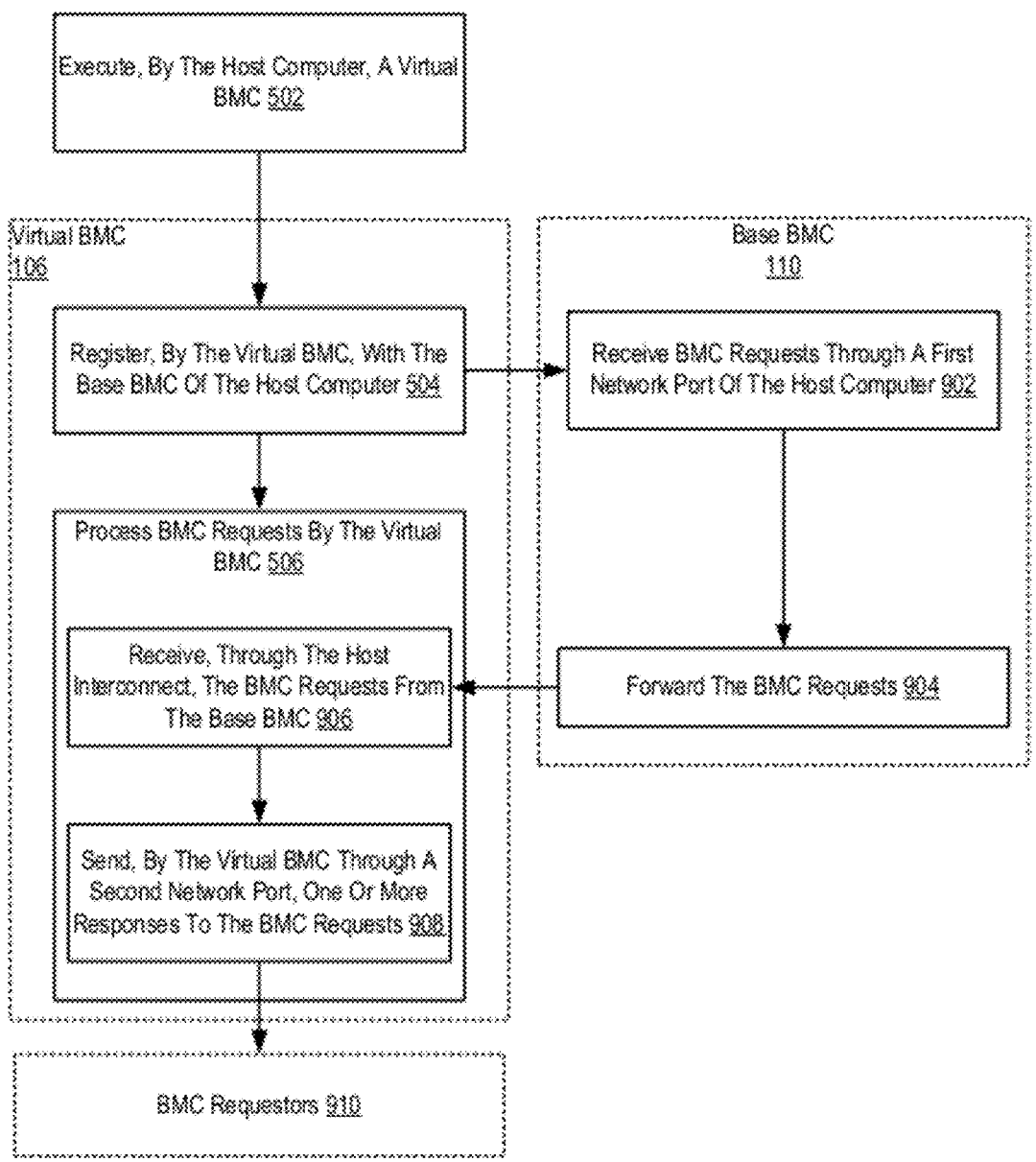
FIG. 9 sets forth a flow chart illustrating a further exemplary method for virtualizing BMC operation according to embodiments of the present invention.

For further explanation, FIG. 9 sets forth a flow chart illustrating a further exemplary method for virtualizing BMC operation according to embodiments of the present invention. The method of FIG. 9 is similar to the method of FIG. 5 in that the method of FIG. 9 includes executing (502) a virtual BMC; registering (504) with the base BMC; and processing (506) BMC requests by the virtual BMC.

The method of FIG. 9 differs from the method of FIG. 5, however, in that the method of FIG. 9 is carried out with the virtual BMC and base BMC in a data communications configuration that includes a first network port dedicated to the base BMC and a second network port dedicated to the virtual BMC, similar to the configuration depicted in the example of FIG. 4. In such a configuration, the base BMC (110) is operatively coupled for data communications with one or more BMC requestors (910) through a first network port of the host computer, the virtual BMC (106) is operatively coupled for data communications with the one or more BMC requestors (910) through a second network port of the host computer, and the virtual BMC (106) is operatively coupled for data communications with the base BMC (110) through a host interconnect.

In the method of FIG. 9, once the virtual BMC (106) registers (504) with the base BMC (110), the base BMC (110) receives (902) BMC requests through the first network port and forwards the BMC requests (904) to the virtual BMC (106). Processing the BMC requests by the virtual BMC in the method of FIG. 10 includes receiving (906), by the virtual BMC through the host interconnect, the BMC requests from the base BMC and sending (908), by the virtual BMC through the second network port, one or more responses to the BMC requests. That is, in contrast to the method of FIG. 8, the virtual BMC in the method of FIG. 9 does not utilize the base BMC to forward responses to BMC requestors (910). Instead, using a separate network port, possibly even a separate communications adapter, the virtual BMC (106) responds directly to the BMC requestors (910). 'Directly' as the term is used here means that data communications (in the form of responses) occur between a virtual BMC and a BMC requestor without the use of the base BMC (110).

Figure 10:
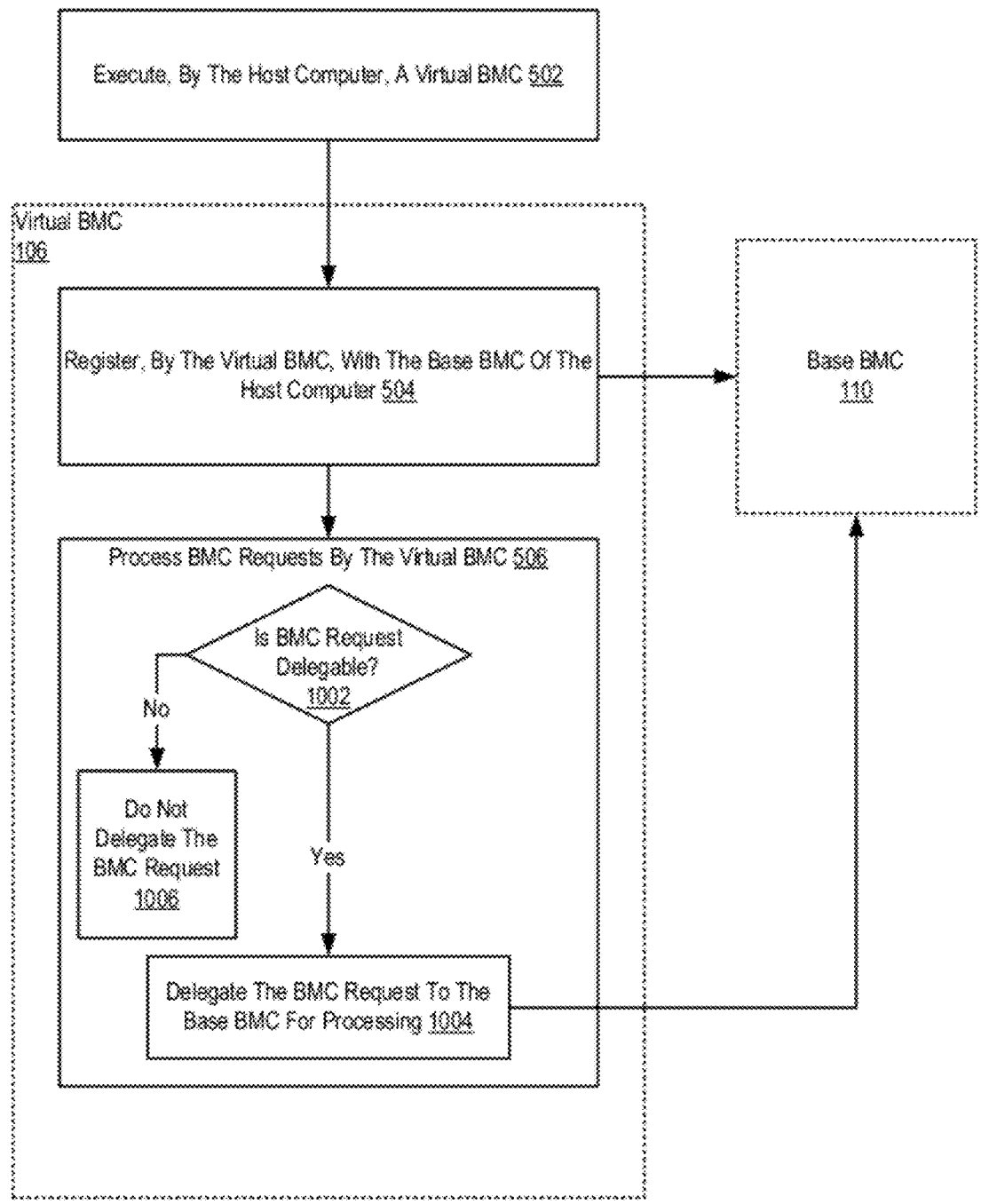
FIG. 10 sets forth a flow chart illustrating a further exemplary method for virtualizing BMC operation according to embodiments of the present invention.

For further explanation, FIG. 10 sets forth a flow chart illustrating a further exemplary method for virtualizing BMC operation according to embodiments of the present invention. The method of FIG. 10 is similar to the method of FIG. 5 in that the method of FIG. 10 includes executing (502) a virtual BMC; registering (504) with the base BMC; and processing (506) BMC requests by the virtual BMC. The method of FIG. 10 differs from the method of FIG. 5, however, in that in the method of FIG. 10, processing (506) BMC requests by the virtual BMC includes determining (1002), whether a BMC request is delegable to the base BMC, and if the BMC request is delegable to the base BMC (110), delegating (1004) the BMC request to the base BMC for processing. If the BMC request is not delegable to the base BMC, the method of FIG. 10 continues by not delegating (1006) the BMC request, instead processing the request by the virtual BMC. A BMC request is delegable to the base BMC when the base BMC is capable of performing the request. That is, in some embodiments, the virtual BMC is implemented to expand functionality of the base BMC. In the method of FIG. 10, however, requests for functionality within the base BMC's capabilities, however, are delegated to the base BMC.

Figure 11:
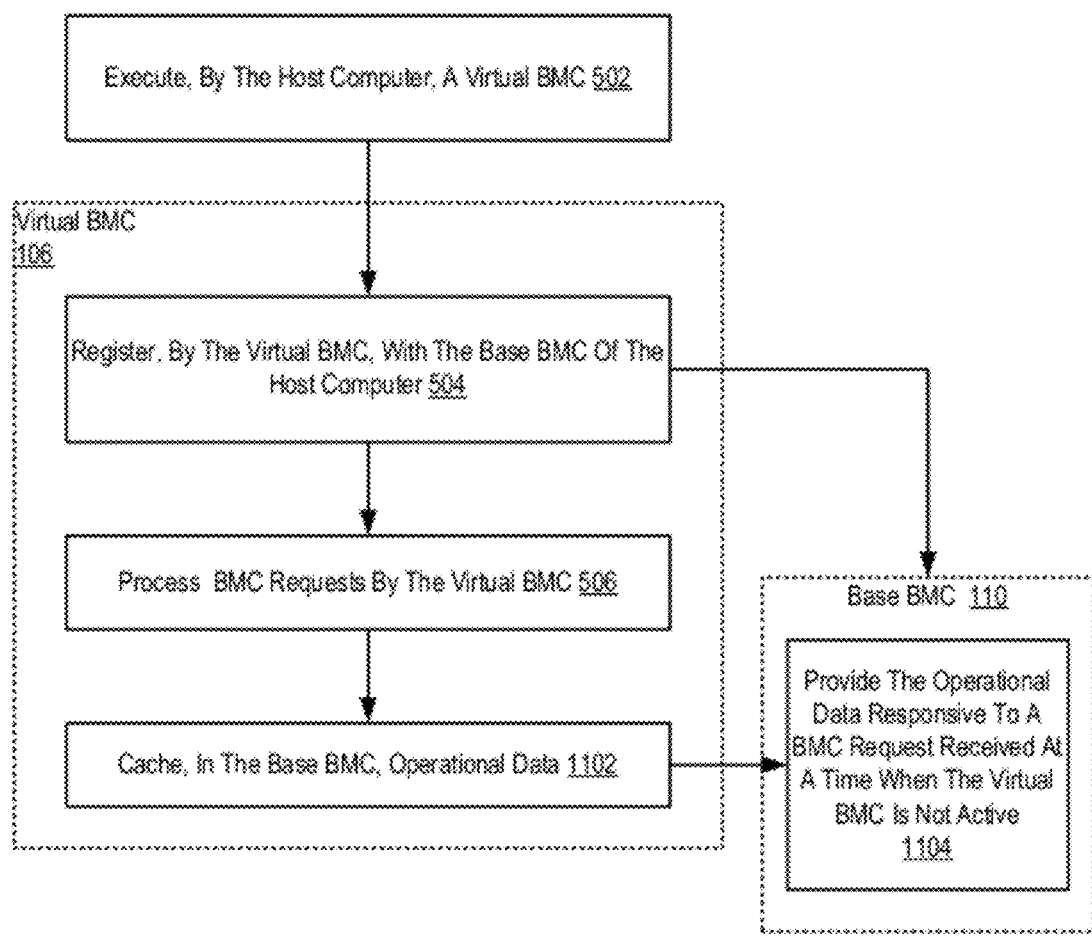
FIG. 11 sets forth a flow chart illustrating a further exemplary method for virtualizing BMC operation according to embodiments of the present invention.

For further explanation, FIG. 11 sets forth a flow chart illustrating a further exemplary method for virtualizing BMC operation according to embodiments of the present invention. The method of FIG. 11 is similar to the method of FIG. 5 in that the method of FIG. 11 includes executing (502) a virtual BMC; registering (504) with the base BMC; and processing (506) BMC requests by the virtual BMC. The method of FIG. 11 differs from the method of FIG. 5, however, in that the method of FIG. 11 includes caching (1102), by the virtual BMC in the base BMC, operational data and providing (1104) the operational data by the base BMC (110) responsive to a BMC request received at a time when the virtual BMC (106) is not active. Operational data as the term is used here may be any type of data describing operation of the virtual BMC. Such operational data, for example, may be information describing virtual BMC capabilities, memory address space, computing resources, and other run-time environment information of the virtual BMC. Such information may be provided, upon request, by the base BMC (110) when the virtual BMC is inactive.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of virtualizing baseboard management controller ('BMC') operation in a host computer comprising a base BMC, the method comprising:
    executing, by the host computer, a virtual BMC, the virtual BMC operatively coupled for data communications with one or more BMC requestors through a network port of a communications adapter of the host computer;
    registering, by the virtual BMC, with the base BMC of the host computer, including assuming the base BMC's network address, wherein the base BMC is operatively coupled for data communications with the BMC requestors through a side-band interface coupled to the network port;
    processing, by the virtual BMC, BMC requests sent to the base BMC, including receiving all BMC requests sent to the base BMC's network address by the virtual BMC and processing, by the virtual BMC, BMC requests that the base BMC is incapable of processing;
    caching, by the virtual BMC in the base BMC, operational data; and
    providing the operational data by the base BMC responsive to a BMC request received at a time when the virtual BMC is not active.

2. The method of claim 1 further comprising: prior to registration of the virtual BMC, processing BMC requests by the base BMC.

3. The method of claim 1, further comprising:
    determining, by the base BMC, periodically at a predefined period of time, whether the virtual BMC is active; and
    upon the base BMC determining that the virtual BMC is not active: deregistering, by the base BMC, the virtual BMC; and processing subsequently received BMC requests by the base BMC.

4. The method of claim 1, wherein:
    the base BMC is operatively coupled for data communications with one or more BMC requestors through a network port of a communications adapter of the host computer; the virtual BMC is operatively coupled for data communications with the base BMC through a host interconnect; and
    processing BMC requests by the virtual BMC further comprises: receiving, by the virtual BMC through the host interconnect, the BMC requests from the base BMC, the base BMC receiving the BMC requests through the network port of the communications adapter of the host computer; and providing, by the virtual BMC to the base BMC through the host interconnect, a response to each BMC request, each response to be sent, by the base BMC through the network port of the communications adapter, to the one or more BMC requestors.

5. The method of claim 1, wherein:
    the base BMC is operatively coupled for data communications with one or more BMC requestors through a first network port of the host computer;
    the virtual BMC is operatively coupled for data communications with the one or more BMC requestors through a second network port of the host computer;
    the virtual BMC is operatively coupled for data communications with the base BMC through a host interconnect; and
    processing BMC requests by the virtual BMC further comprises: receiving, by the virtual BMC through the host interconnect, the BMC requests from the base BMC, the base BMC receiving the BMC requests through the first network port; and sending, by the virtual BMC through the second network port, one or more responses to the BMC requests.

6. The method of claim 1, wherein executing the virtual BMC further comprises executing the virtual BMC as a component of an operating system executing on the host computer.

7. The method of claim 1, wherein executing the virtual BMC further comprises executing the virtual BMC as a virtual machine supported by a hypervisor.

8. The method of claim 1, wherein processing BMC requests by the virtual BMC further comprises:
    determining, whether a BMC request is delegable to the base BMC; and
    if the BMC request is delegable to the base BMC, delegating the BMC request to the base BMC for processing.

9. An apparatus for virtualizing baseboard management controller ('BMC') operation in a host computer comprising a base BMC, the apparatus comprising a computer processor, a computer memory operatively coupled to the computer processor, the computer memory having disposed within it computer program instructions that, when executed by the computer processor, cause the apparatus to carry out the steps of:
- executing, by the host computer, a virtual BMC, the virtual BMC operatively coupled for data communications with one or more BMC requestors through a network port of a communications adapter of the host computer;
- registering, by the virtual BMC, with the base BMC of the host computer, including assuming the base BMC's network address, wherein the base BMC is operatively coupled for data communications with the BMC requestors through a side-band interface coupled to the network port;
- processing, by the virtual BMC, BMC requests sent to the base BMC, including receiving all BMC requests sent to the base BMC's network address by the virtual BMC and processing, by the virtual BMC, BMC requests that the base BMC is incapable of processing;
- caching, by the virtual BMC in the base BMC, operational data; and
- providing the operational data by the base BMC responsive to a BMC request received at a time when the virtual BMC is not active.

10. The apparatus of claim 9, further comprising computer program instructions that, when executed by the computer processor, cause the apparatus to carry out the steps of:
- determining, by the base BMC, periodically at a predefined period of time, whether the virtual BMC is active; and
- upon the base BMC determining that the virtual BMC is not active: deregistering, by the base BMC, the virtual BMC; and processing subsequently received BMC requests by the base BMC.

11. The apparatus of claim 9, wherein: the base BMC is operatively coupled for data communications with one or more BMC requestors through a network port of a communications adapter of the host computer; the virtual BMC is operatively coupled for data communications with the base BMC through a host interconnect; and
- processing BMC requests by the virtual BMC further comprises: receiving, by the virtual BMC through the host interconnect, the BMC requests from the base BMC, the base BMC receiving the BMC requests through the network port of the communications adapter of the host computer; and providing, by the virtual BMC to the base BMC through the host interconnect, a response to each BMC request, each response to be sent, by the base BMC through the network port of the communications adapter, to the one or more BMC requestors.

12. The apparatus of claim 9, wherein:
- the base BMC is operatively coupled for data communications with one or more BMC requestors through a first network port of the host computer;
- the virtual BMC is operatively coupled for data communications with the one or more BMC requestors through a second network port of the host computer;
- the virtual BMC is operatively coupled for data communications with the base BMC through a host interconnect; and
- processing BMC requests by the virtual BMC further comprises: receiving, by the virtual BMC through the host interconnect, the BMC requests from the base BMC, the base BMC receiving the BMC requests through the first network port; and sending, by the virtual BMC through the second network port, one or more responses to the BMC requests.

13. The apparatus of claim 9, wherein processing BMC requests by the virtual BMC further comprises:
- determining, whether a BMC request is delegable to the base BMC; and
- if the BMC request is delegable to the base BMC, delegating the BMC request to the base BMC for processing.

14. A computer program product for virtualizing baseboard management controller ('BMC') operation in a host computer comprising a base BMC, the computer program product disposed upon a computer readable storage medium, wherein the computer readable storage medium is not a signal, the computer program product comprising computer program instructions that, when executed, cause a computer to carry out the steps of:
- executing, by the host computer, a virtual BMC, the virtual BMC operatively coupled for data communications with one or more BMC requestors through a network port of a communications adapter of the host computer;
- registering, by the virtual BMC, with the base BMC of the host computer, including assuming the base BMC's network address, wherein the base BMC is operatively coupled for data communications with the BMC requestors through a side-band interface coupled to the network port;
- processing, by the virtual BMC, BMC requests sent to the base BMC, including receiving all BMC requests sent to the base BMC's network address by the virtual BMC and processing, by the virtual BMC, BMC requests that the base BMC is incapable of processing;
- caching, by the virtual BMC in the base BMC, operational data; and
- providing the operational data by the base BMC responsive to a BMC request received at a time when the virtual BMC is not active.

15. The computer program product of claim 14, further comprising computer program instructions that, when executed, cause the computer to carry out the steps of:
- determining, by the base BMC, periodically at a predefined period of time, whether the virtual BMC is active; and
- upon the base BMC determining that the virtual BMC is not active: deregistering, by the base BMC, the virtual BMC; and processing subsequently received BMC requests by the base BMC.

16. The computer program product of claim 14, wherein:
- the base BMC is operatively coupled for data communications with one or more BMC requestors through a network port of a communications adapter of the host computer; the virtual BMC is operatively coupled for data communications with the base BMC through a host interconnect; and
- processing BMC requests by the virtual BMC further comprises: receiving, by the virtual BMC through the host interconnect, the BMC requests from the base BMC, the base BMC receiving the BMC requests through the network port of the communications adapter of the host computer; and providing, by the virtual BMC to the base BMC through the host interconnect, a response to each BMC request, each response to be sent, by the base BMC through the network port of the communications adapter, to the one or more BMC requestors.

17. The computer program product of claim 14, wherein:
- the base BMC is operatively coupled for data communications with one or more BMC requestors through a first network port of the host computer;

the virtual BMC is operatively coupled for data communications with the one or more BMC requestors through a second network port of the host computer;

the virtual BMC is operatively coupled for data communications with the base BMC through a host interconnect; and processing BMC requests by the virtual BMC further comprises: receiving, by the virtual BMC through the host interconnect, the BMC requests from the base BMC, the base BMC receiving the BMC requests through the first network port; and sending, by the virtual BMC through the second network port, one or more responses to the BMC requests.

18. The computer program product of claim 14, wherein processing BMC requests by the virtual BMC further comprises:

determining, whether a BMC request is delegable to the base BMC; and if the BMC request is delegable to the base BMC, delegating the BMC request to the base BMC for processing.

* * * * *